April 15, 1941.  B. E. SHAW  2,238,401
SOLENOID
Filed July 11, 1938
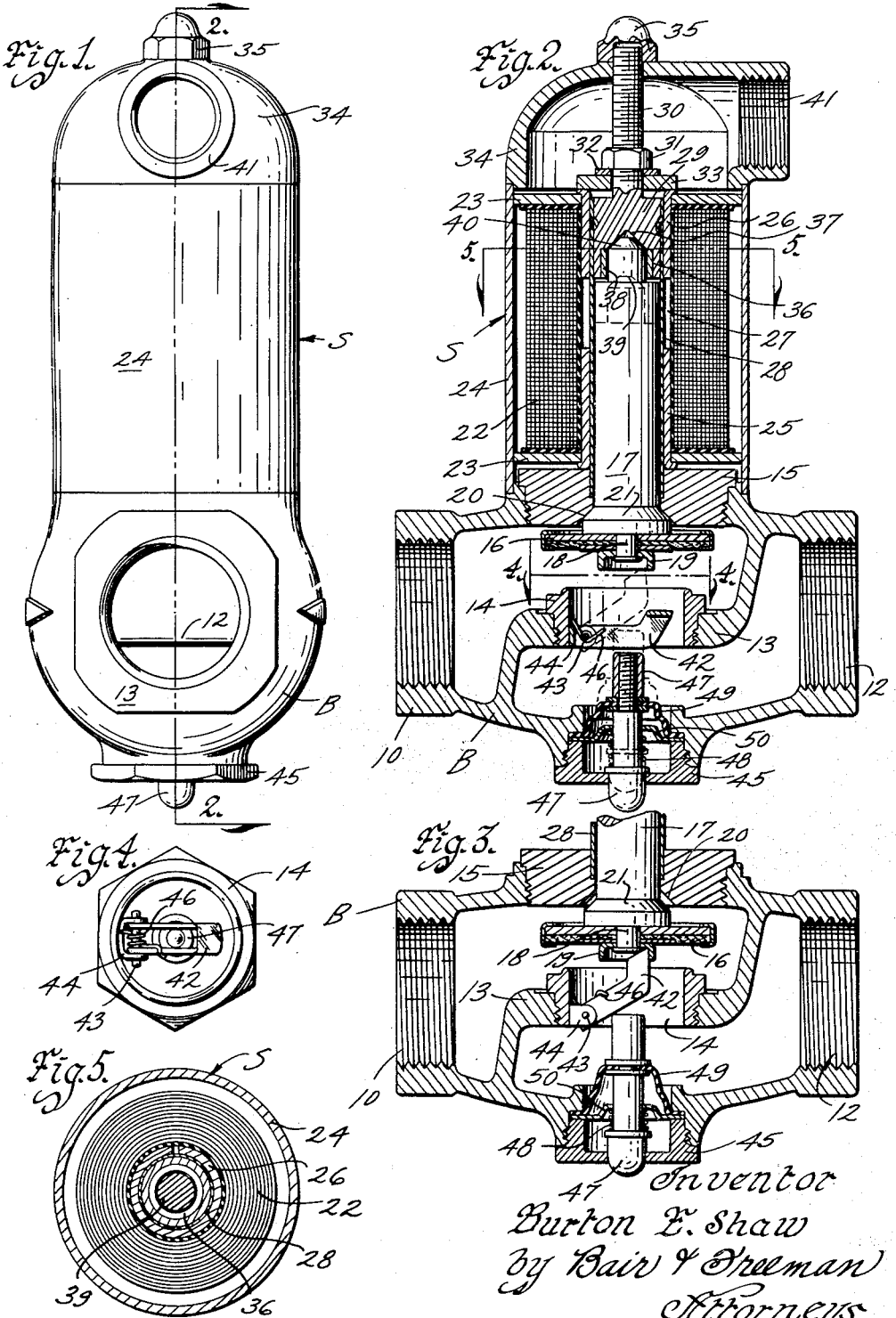
Inventor
Burton E. Shaw
by Bair & Freeman
Attorneys Patented Apr. 15, 1941

2,238,401

UNITED STATES PATENT OFFICE 2,238,401

SOLENOID

Burton E. Shaw, Bristol, Ind., assignor to Penn Electric Switch Co., Goshen, Ind., a corporation of Iowa Application July 11, 1938, Serial No. 218,606

1 Claim. (Cl. 175—338)

An object of my invention is to provide a solenoid valve in which the solenoid and its plunger are capable of being manufactured economically and at the same time are so constructed as to minimize noise attendant upon energization of the valve especially with alternating current.

A further object is to provide a solenoid structure particularly adaptable for use in connection with a valve such as a gas valve, the valve having a replaceable seat for convenience and economy and which is normally closed by a valve disk weighted by a plunger.

Another object is to provide an efficiently operating solenoid for the plunger which is effective, when energized, to attract the plunger and thereby open the valve, the solenoid including a pair of magnetic sleeves in the core thereof which have between them a gap adjacent the longitudinal center of the coil for concentrating the magnetic flux at this point.

Another object is to provide beyond the gap a pole member having a socket to receive the head of the plunger and having therein a shading coil to restrict the magnetic lines of force passing between the pole member and the plunger to a definite path to secure maximum efficiency, the plunger being held spaced from the bottom of the socket by a stop means spaced from the center of the solenoid and located beyond the end of the solenoid.

Still another object is to provide the stop means in the form of an enlarged beveled flange on the plunger coacting with a similarly beveled stop seat, such coaction between the flange and seat resulting in reduction of the noise of operation of the structure to a minimum.

Still a further object is to provide means for latching the valve open upon power failure, such means having a manually operable latch pin projecting to the exterior of the valve body, novel means including a diaphragm being provided to prevent leakage of gas from the valve body around the pin.

With the foregoing objects in view the accompanying drawing illustrates one complete example of the physical embodiment of my solenoid valve constructed according to the best mode I have so far devised to apply the principles of the invention.

On said drawing, Figure 1 is an end elevation of my solenoid valve showing the outlet side thereof.

Figure 2 is a vertical sectional view on the line 2—2 of Figure 1 showing the valve in open position as a result of energization of its solenoid coil.

Figure 3 is a similar sectional view of the lower portion of Figure 2 showing the valve latched in open position.

Figure 4 is a sectional view on the line 4—4 of Figure 2 showing a plan view of a removable valve seat member of my valve; and Figure 5 is a sectional view on the line 5—5 of Figure 2 showing the relation of certain parts of the invention to each other.

On the accompanying drawing I have used the reference character B to indicate generally a valve body and S a solenoid for operating the valve. The valve body B has an inlet 10 and an outlet 12. Between the inlet and the outlet is a partition 13 having a central opening in which is mounted a valve seat member 14. The valve seat member 14 is removable relative to the partition 13 when a closure member 15 for the body B is removed. For this purpose it will be noted that the valve seat member 14 is threaded in the partition 13. With the arrangement described it is possible to renew the valve seat member when necessary without having to discard the entire valve body B.

For seating on the valve seat 14 I provide a valve disk 16. It is secured directly to the lower end of a plunger 17 instead of loosely connected therewith as in usual constructions which result in considerable noise being developed during operation of the valve. The direct connection in the case of my valve is accomplished by riveting a reduced extension 18 of the plunger 17 in an annular cup 19.

The closure member 15 is provided with a stop seat 20 which it will be noted is beveled. A stop flange 21 on the plunger 17 is adapted to coact therewith and is similarly beveled.

The solenoid S includes a solenoid coil 22. It is confined between magnetic end members 23 and enclosed in a magnetic casing 24. In the bore of the coil 22 magnetic sleeves 25 and 26 are located which terminate spaced from each other to leave a gap 27 between them.

The magnetic sleeves 25 and 26 surround a non-magnetic tube 28. The sleeves and the tube are longitudinally split to prevent eddy currents from transversing them and thereby causing undue heating and inefficiency of the solenoid.

The lower end of the tube 28 is secured as by soldering or brazing in the closure member 15 of the valve body B. Soldered in its upper end is a pole member 29 having a threaded shank 30. The solenoid coil 22, its end members 23 and the magnetic sleeves 25 and 26 are all retained in rigid assembly against vibration (when the coil is energized) by a nut 31 on the shank 30. Interposed between the nut and the upper end of the sleeve 26 are washers 32 and 33.

A cover member 34 is provided for the upper end of the solenoid S which is retained in position by a second nut 35 on the shank 30. The cover 34 in turn secures the magnetic casing 24 in position by contacting the upper end thereof and causing its lower end to contact the valve body B. When the nut 35 is tightened after the nut 31 has been tightened, all of the parts 22, 23, 24, 25, 26 and 34 are effectively placed under such compression that all vibration of any of them is entirely eliminated.

The pole member 29 has a socket 36 therein. The bottom of the socket is beveled and indicated at 37. Mounted in the socket 36 is a shading coil or ring 38. The plunger 17 has a reduced head 39 to enter the shading ring. The upper end of the head 39 is beveled as indicated at 40 to terminate adjacent the beveled bottom 37 of the socket 36 when the valve is in energized open position as shown in Figure 2. It will be noted that there is slight clearance between the head 39 and the shading coil 38 and also between the plunger 17 and the tube 28. Such clearance facilitates operation of the valve although to prevent rattling and noise of the valve when the solenoid is energized, it is necessary that certain parts be engaged with each other and held tightly in such engagement by energization of the solenoid coil to prevent such movement as would cause rattling and noise. This is accomplished in my valve by the stop flange 21 engaging the stop seat 20, the parts being so proportioned that the upper end 40 of the plunger head is adjacent but spaced from the socket bottom 37.

The cover 34 is provided with a threaded opening 41 to receive a conduit through which the electric wiring for the solenoid coil 22 extends. This permits a good mechanical and electrical connection to the solenoid coil as recommended by the underwriters.

Upon power failure, it is sometimes desirable to latch the valve in open position until the power comes back on. For this purpose I provide a latch 42 pivoted as at 43 on a bracket 44. The bracket 44 is suitably secured to the valve seat member 14. The latch 42 is normally retained in inoperative position due to its own weight and the bias of a spring 46.

For swinging the latch 42 to the latched position shown in Figure 3, I provide a pin 47 slidably mounted in the bottom of the valve body B. A spring 48 normally retains the pin 47 in inoperative position and a diaphragm 49 of rubber or leather or the like serves to positively prevent any escape of gas from the interior of the valve body B. The pin 47 is slidably mounted in a closure nut 45 and a washer 50.

Practical operation

In the normal operation of my solenoid valve whenever the coil 22 is energized, the parts 23, 24, 25 and 26 become magnetized. The magnetic force is concentrated adjacent the longitudinal center of the solenoid coil 22 in the gap 27. Accordingly it acts strongly upon the upper end of the plunger 17 (considering the dotted position in Figure 2) and lifts the plunger, causing it to tend to move to a position with its center of mass centered in the gap 27. It is stopped, however, by the surfaces 20 and 21 engaging each other before such position of the plunger can be reached.

The magnetism also saturates the pole member 29 so that it has some lifting effect on the plunger 17. Such lifting effect is increased as the distance between the upper end 40 of the plunger head 39 and the socket bottom 37 is decreased. As the plunger head enters the shading coil 38 stray magnetic flux is concentrated inside the shading coil thus increasing the magnetic attraction and consequently the efficiency of the structure. Finally when the valve is fully open, there is but very little space left between the upper end 40 of the plunger and the socket bottom 37 thus increasing the attraction as closely to maximum as possible without actual contact between these surfaces. The relatively large flange 21 acting as a stop for the motion of the plunger considerably reduces the noise as compared with the surfaces 37 and 40 accomplishing this purpose. The beveled character of the faces 20 and 21 also contributes to reduction of noise and obtaining of maximum efficiency of operation of the structure.

Upon power failure when it is desirable to latch the valve in open position, the pin 47 is pushed inwardly until it assumes the position shown in dotted lines in Figure 2. Thereafter the pin may be released and the spring 48 will return it to the position shown in Figure 2 with the valve only part way open and retained in such position by coaction of the latch 42 with the rim of the annular cup 19 as shown in Figure 3. Thereafter when power is resumed, energization of the solenoid coil 22 will result in the valve being opened to the position in Figure 2 which automatically releases the latch 42 and permits it to return to its normal position. The solenoid will then function automatically in response to subsequent energization of its coil.

From the description of my solenoid valve taken in connection with the accompanying drawing, it will be readily apparent to those skilled in the art that changes of construction can be made without departing from the essential spirit of my invention. Accordingly it is my purpose to cover by my appended claim such deviations as will be reasonably included within their scope.

I claim as my invention:

In a device of the class described, a solenoid coil, a plunger tube therein, a plunger substantially filling the bore of said plunger tube and having its marginal upper end reduced in diameter, a pole member in said solenoid coil, said pole member having a stationary shading ring therein constituting a socket to receive said reduced marginal end of said plunger when said coil is energized, with said reduced marginal end substantially fitting said shading ring and being surrounded thereby, said reduced end being removed from said socket and shading ring when said coil is deenergized, a stop flange on said plunger below said solenoid coil, and a stop seat rigid with relation to said solenoid coil, said stop seat having a beveled face starting at the lower edge of said bore and provided for said stop flange to seat against when said solenoid coil is energized, said stop flange having a similarly beveled face to fit the beveled face of said stop seat when said coil is energized, said beveled face of said stop seat being so spaced relative to the inner end of said socket as to prevent contact and effect but slight spacing of said marginal upper end of said plunger relative to said socket inner end in the energized position of said plunger.

BURTON E. SHAW.